United States Patent [19]

Moriguchi et al.

[11] 4,412,228
[45] Oct. 25, 1983

[54] HEAT-SENSITIVE RECORDING HEAD DRIVING METHOD

[75] Inventors: Haruhiko Moriguchi; Tomio Murayama, both of Kanagawa, Japan

[73] Assignee: Fuji Xerox Co., Ltd., Tokyo, Japan

[21] Appl. No.: 217,606

[22] Filed: Dec. 18, 1980

[30] Foreign Application Priority Data

Dec. 18, 1979 [JP] Japan ................................ 54-163598

[51] Int. Cl.³ .......................................... G01D 15/10
[52] U.S. Cl. .............................. 346/76 PH; 346/1.1; 219/216
[58] Field of Search .................... 346/76 PH, 1.1; 219/216; 400/120

[56] References Cited

U.S. PATENT DOCUMENTS 3,984,844 10/1976 Tanno et al. ............... 346/76 PH X Primary Examiner—Stafford D. Schreyer
Attorney, Agent, or Firm—Sughrue, Mion, Zinn, Macpeak and Seas

[57] ABSTRACT

A method of driving a heat-sensitive recording head with a very small number of components. In the recording head, leads are arranged on an insulated substrate extending on both sides of the substrate in parallel with one another with heat generating elements disposed between adjacent leads. A microcomputer divides data inputted thereto in a time division manner into data blocks each having a predetermined amount of data. The data in each data block is rearranged by skipping data every predetermined number of data. The data thus rearranged is applied in a parallel mode to a plurality of shift registers and from the shift registers coupled to leads on one side of the recording head successively.

6 Claims, 5 Drawing Figures

HEAT-SENSITIVE RECORDING HEAD DRIVING METHOD

BACKGROUND OF THE INVENTION

The present invention relates to a method and apparatus for driving a heat-sensitive recording head with a continuous heat generating element which is employed in a facsimile printer or the like.

In a conventional heat-sensitive recording head of this general type, especially one intended for line scanning, the driving leads correspond to the recording positions in the ratio of 1:1. Because of this, conventional heat-sensitive recording heads suffer from a difficulty that, where it is required to form a record of high quality with a high recording density, the distance between adjacent leads must unavoidably be made small which makes it difficult to connect the leads to the driving circuit.

In order to overcome this difficulty, a recording head with alternately arranged leads as shown in FIG. 1 has been proposed in the art. The recording head, as shown in FIG. 1, includes a heat-resistant and electrically insulated substrate 1, which provides a suitable heat sink effect and which may be a ceramic plate or which may be formed by providing a heat sink on a ceramic plate, and an assembly of heat generating elements 2 arranged in a line, each corresponding to a recording position. The assembly is formed with a thin film, thick film or semiconductor technique. The surface of the assembly of heat generating elements 2 is covered with a protective layer of glass or the like in order to improve the wear-resistance thereof. The recording head further includes a group 3 of source side leads $a_1$ through $a_n$ and a group 4 of sink side leads $b_1$ through $b_n$ which are adapted to supply current to the heat generating elements 2. The leads $a_1$ through $a_n$ and $b_1$ through $b_n$ are arranged alternately on both sides of the assembly of heat generating elements 2 in such a manner that they segregate the heat generating elements 2 from one another according to the required recording density.

A heat-sensitive recording head of this type has a number of alternate leads which serve as common leads for adjacent recording positions. Therefore, the recording head is advantageous in that the distance between adjacent leads which are connected to the drive circuit can be increased to twice the recording density and the alignment of the leads with the heat generating elements can be readily achieved. However, the recording head cannot be driven with a conventional heat-sensitive recording head driving device because the leads merely segregate the heat generating elements do not correspond to the recording positions in the ratio of 1:1.

FIG. 2 shows an example of a drive circuit for the alternate lead type recording head shown in FIG. 1. In FIG. 2, reference numeral 31 designates a single-line memory for storing one line of data A to be recorded and 32 and 33 designate half-line memories, respectively. The bit data stored in the single-line memory 31 is divided every two adjacent bits to form two groups of data. The two groups of data thus formed are stored in the half-line memories 32 and 33, respectively. Further in FIG. 2, reference numeral 34 designates a change-over switch, 35 the heat-sensitive recording head shown in FIG. 1 and 36 a switch for selecting between common terminals 37 and 38 which are connected, respectively, to a group of odd-numbered sink-side leads of the recording head and to a group of even-numbered sink-side leads. The half-line memory 33 is of a series-input parallel-output type. Its output is connected to the source-side leads of the recording head 35.

In operation, first one line of data A is stored in the memory 31. The data stored is then divided into a first group of data bits (for instance the 1st, 2nd, 5th, 6th, 9th, 10th, ... bits) and a second group of data bits (for instance the 3rd, 4th, 7th, 8th, 11th, 12th, ... bits) which are stored in the half-line memories 32 and 33, respectively. Then, the contents of the half-line memory 33 are supplied to the source-side leads of the recording head 35. In this operation, with the selecting switch 36 operated to suitably select between the common terminals 37 and 38, recording is carried out every two adjacent bits. After this operation has been completed, the switch 34 is operated to transfer the contents of the half-line memory 32 to the half-line memory 33. The output signal of the memory 33 is applied to the recording head 35 and the switch 36 is operated similarly as in the above-described case to record one line of data.

The above-described method and circuit are disadvantageous in that, even if a matrix arrangement is employed to reduce the amount of data handled at a time, it is necessary to provide a data distribution circuit with a number of elements, a number of control signals must be used and the necessary timing is complicated. Therefore, the prior art device and method are uneconomical and low in reliability.

Accordingly, an object of the invention is to provide a method and device for driving a heat-sensitive recording head in which all of the above-described difficulties accompanying a conventional driving method have been eliminated and in which the recording head can be driven satisfactorily with a circuit having an extremely small number of components.

SUMMARY OF THE INVENTION

In accordance with these objects, a device and method are provided in which a microcomputer is used in a first stage to rearrange data inputted successively and the data thus rearranged are set in a shift manner up to the last stage with the aid of the outputs of the microcomputer.

More specifically, the invention provides a method of driving a heat-sensitive recording head in which leads are alternatively arranged on an insulated substrate with the leads extending on both sides of the substrate in parallel with one another and with heat generating elements disposed between adjacent leads. The method of the invention includes the steps of dividing with a microcomputer data inputted in a time division manner into data blocks each having a predetermined amount of data, rearranging the data in each data block by skipping data every predetermined number of data, and applying the data thus rearranged in a parallel mode to a plurality of shift registers so as to be set on leads on one side of the recording head successively. Preferably, a data distributing circuit including a plurality of memories and an electronic switch is inserted between the microcomputer and the plurality of shift registers. Preferably, the memories are first-in first-out memories and the shift registers are series-in parallel-out shift registers.

DESCRIPTION OF THE PREFERRED EMBODIMENTS

A preferred embodiment of the invention will be described with reference to FIGS. 3 through 5.

Figure 1:
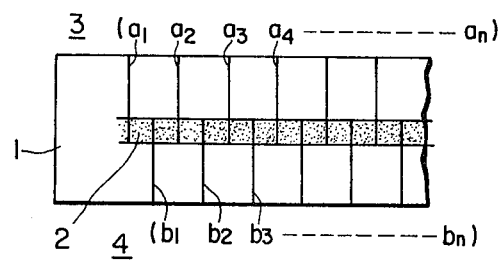
FIG. 1 is a plan view of a conventional heat-sensitive recording head.
Figure 2:
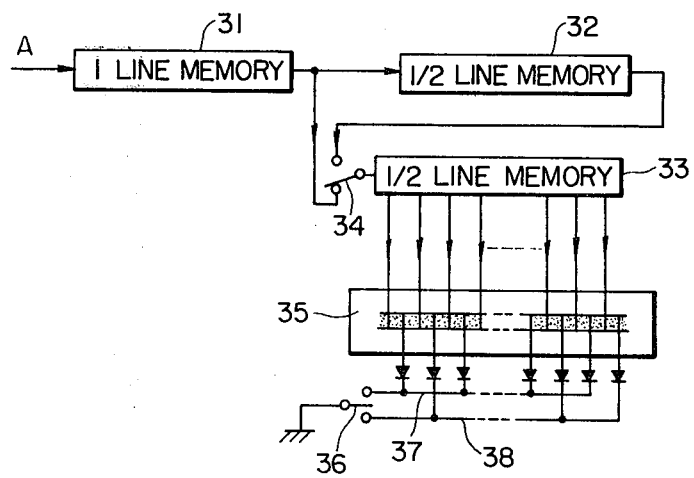
FIG. 2 is a cricuit diagram, partly as a block diagram, showing a circuit for driving the recording head according to a conventional method.
Figure 3:
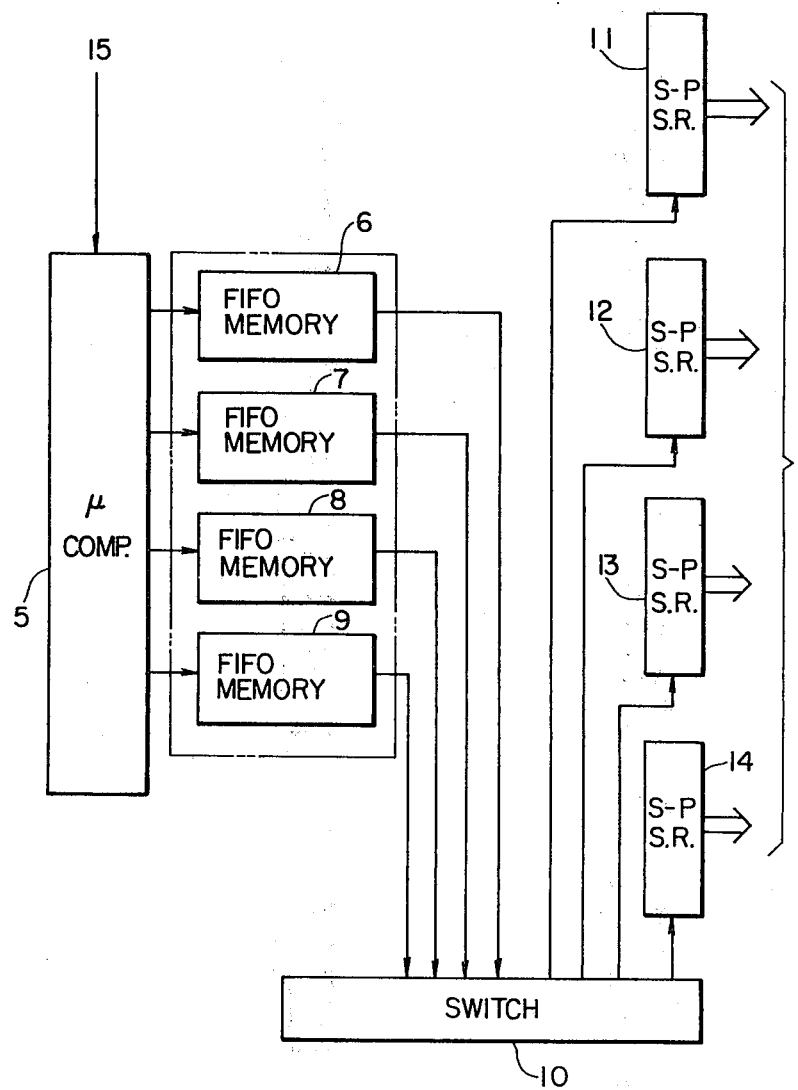
FIG. 3 is a block diagram showing a preferred embodiment of the invention.
Figure 4:
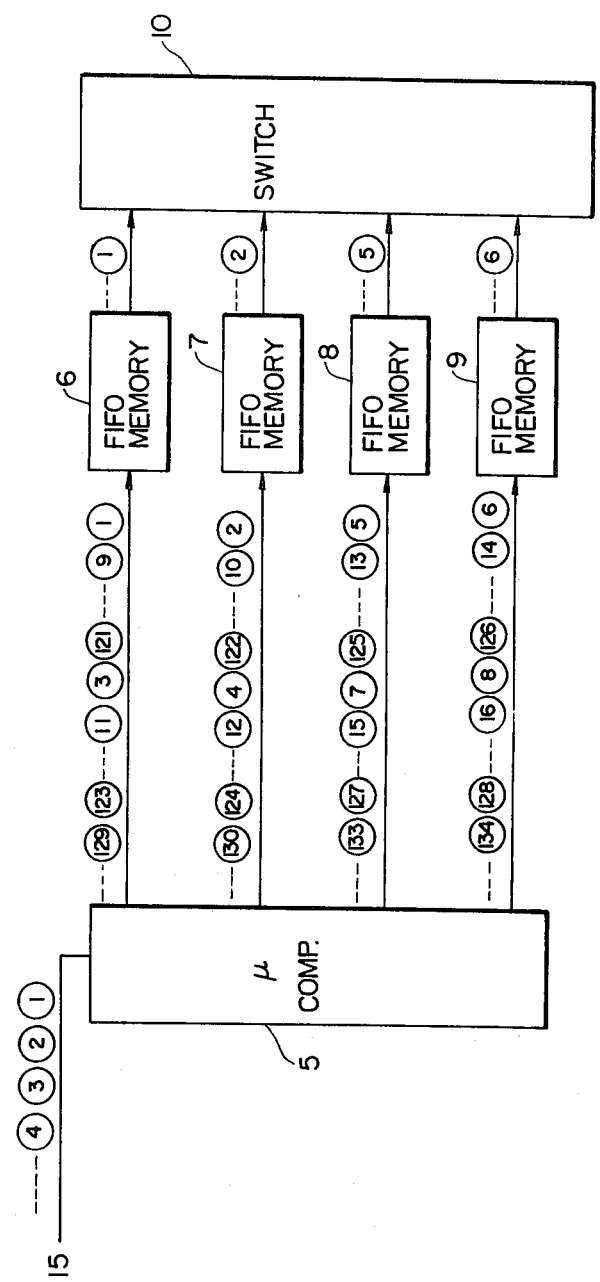
FIGS. 4 and 5 are diagrams for a description of the operation of the preferred embodiment of the invention.

FIG. 3 shows a data distributing circuit for a recording head having a 64 dot per block arrangement constructed according to the preferred embodiment of the invention. In FIG. 3, reference numeral 5 designates a microcomputer. A microcomputer such as a transmission controlling microcomputer which is substantially in an idling state for image data communication may be commonly employed.

First-in first-out memories 6 through 9 (hereinafter referred to as "FIFO memories 6 through 9) each have a capacity of 64 bits. In the FIFO memories, data is written successively starting with the top. After all 64 bits have been written, the data is outputted starting with the top.

The FIFO memories 6 through 9 are available as one unit as indicated by the broken line in FIG. 3. In FIG. 3, reference numerals 11 through 14 designate series-parallel conversion shift registers each having a parallel output of 16 bits.

The operation of the above-described circuit according to the preferred embodiment of the invention will be described. As shown in FIG. 4, data points (1), (2), (3), (4) . . . are applied to a video signal line 15 successively. In the microcomputer 5, the data thus received is rearranged every 128 bits, so that the data is distributed to the FIFO memories 6, 7, 8 and 9 in a 2 bits unit/2 bits skip manner as (1), (2), (5), (6) . . . . When the data distribution has been completed up to data point (126), 64 bits in total are distributed to the FIFO memories 6 through 9.

Then, the remaining data points (3), (4), (7), (8) . . . are distributed. The microcomputer rearranges the following 128 bits before the data point (128) is distributed to the FIFO memory 9. Upon distribution of the data point (128) to the FIFO memory 9, the microcomputer 5 distributes the data points (129) through (256) to the FIFO memories 6 through 9 in the same manner. When the data of 256 bits has been distributed to the FIFO memories 6 through 9, the memories 6 through 9 are filled. After this, the FIFO memories 6 through 9 output the data in the order of data (1), (2), (5) and (6) in response to the succeeding data distribution.

Figure 5:
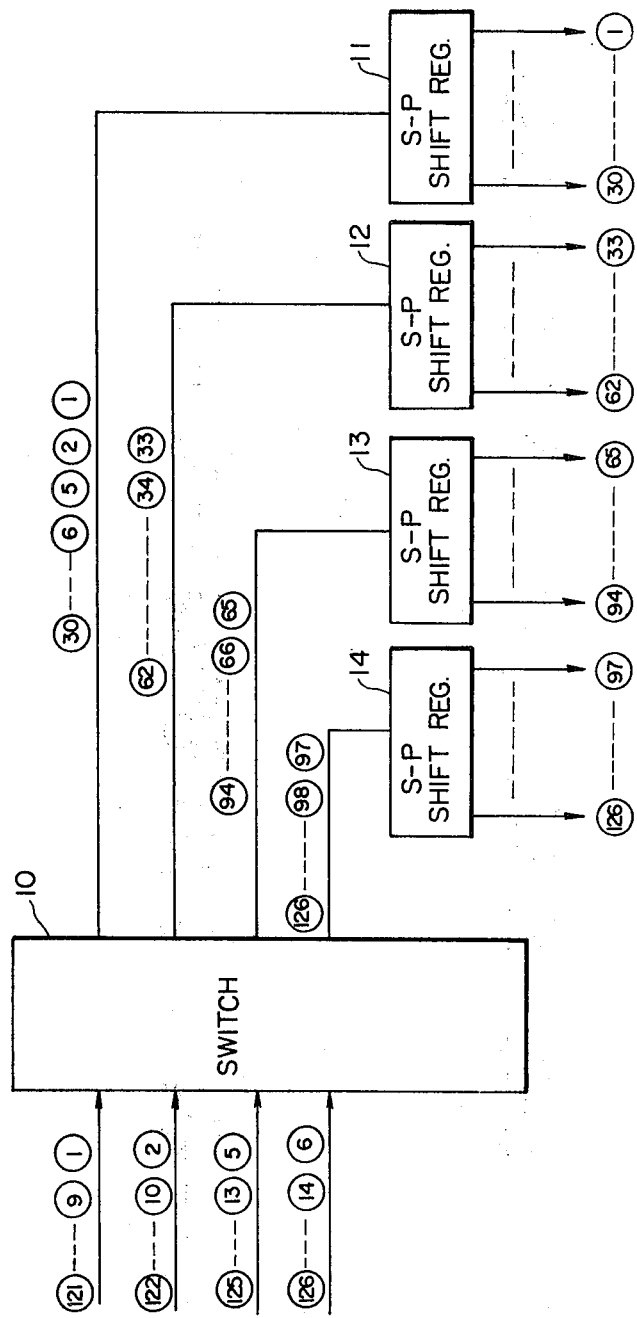

In this operation, an electronic switch 10 delivers the data outputted by the FIFO memories 6 through 9 to the shift registers 11 through 14 successively in the order indicated in FIG. 5. When the data of 64 bits from data points (1) to (126) have been applied in the 2 bits unit/2 bits skip manner to the shift registers, the thermal lead is excited to record the data. Then, following the first recording, the second recording is carried out with the data points (3) through (128) applied to the shift registers 11 through 14.

In this manner, the first and second blocks are recorded. The recording of each line can be accomplished in the same manner.

The reason why the FIFO memories 6 through 9 are provided in parallel with the microcomputer 5 is to increase the data outputting speed of the microcomputer 5 thereby to provide a longer period of time for exciting the heat-sensitive recording head. The FIFO memories 6 through 9 operate to subject the data to time delay to allow the microcomputer to determine whether or not the data input signal is a write line skip signal during the period of time provided by the time delay. Thus, the employment of the FIFO memories results in an effective data process.

However, the provision of the FIFO memories 6 through 9 is not always necessary in the invention.

As is apparent from the above description, according to the invention, a microcomputer is provided in a first stage to rearrange the data and the shift registers are set up to the last stage successively by the outputs of the microcomputer. Therefore, the device is considerably simplified and the device provided according to the invention is economical and has a high reliability.

What is claimed is:

1. A method of driving a heat-sensitive recording head in which leads are alternately arranged on an insulated substrate with the leads extending alternately to one side or the other of the substrate and being parallel with one another and heat generating elements are disposed between adjacent leads comprising the steps of dividing with a microcomputer data inputted in a time division manner into data blocks each having a predetermined amount of data; rearranging the data in each data block by skipping data every predetermined number of data, and applying the data thus rearranged in a parallel mode to a plurality of series-in parallel out shift registers so as to be set on leads on one side of said recording head successively, and wherein a data distributing circuit comprises a plurality of first-in first-out memories and an electronic switch is inserted between the microcomputer and the plurality of shift registers.

2. The method of claim 1, wherein said data is rearranged in a 2 bits unit/2 bits skip manner (1), (2), (5), (6) . . . (K-3), (K-2) and distributed to said memories, then the remaining data (3), (4), (7), (8) . . . (K-1), (K) is distributed to said memories until all the data in said data point has been distributed to said memories.

3. The method of claim 2 comprising the additional steps of rearranging data in a second block in the same predetermined manner and distributing it to said memories.

4. A system of driving a heat-sensitive recording head having leads alternately arranged on an insulated substrate with leads extending alternately to one side or the other and being parallel with one another and heat-generating elements disposed between adjacent leads comprising;

a microcomputer receiving an input data signal and dividing the data therein in a predetermined manner into discrete data blocks and said microcomputer rearranging the data in each data block in a predetermined manner;

a plurality of memories disposed in parallel and receiving the outputs of said microcomputer, a series of shift registers receiving data from said memories to be applied successively to the leads on one side of said recording head, and switch means to gate said data from said memories to said shift registers.

5. The system of claim 4, wherein said memories comprise first-in first-out memories and said plurality of shifts registers comprises a plurality of series-in parallel-out shift registers.

6. The system of claim 4, wherein said switch means distributes said data in said data blocks from said memories to said shift registers in a parallel mode.

* * * * *